United States Patent Office 3,550,158
Patented Dec. 22, 1970

3,550,158
LINEAR HIGH POLYMERS OF DIOLEFINES AND PROCESSES FOR PREPARING THE SAME
Giulio Natta, Lido Porri, and Giorgio Mazzanti, Milan, Italy, assignors to Montecatini Edison S.p.A., a corporation of Italy
No Drawing. Continuation of application Ser. No. 535,252, Mar. 17, 1966. This application July 3, 1968, Ser. No. 755,481
Int. Cl. C08d 3/06, 3/10
U.S. Cl. 260—94.3         16 Claims

ABSTRACT OF THE DISCLOSURE

There are disclosed crystalline polymers of diolefines, more particularly of butadiene, isoprene and pentadiene-1,3, showing a high percent of X-ray crystallinity due to 1,4-transconfiguration of more than 90%, and up to 99% of the diolefin units making up the polymer macromolecules, and a method for producing the same.

---

The primary object of the invention is to provide new polymers of conjugated diolefines at least one of the double bonds of which is a vinyl double bond, which polymers have an exceptionally regular structure and a high degree of crystallinity.

Another object is to provide a novel method for making the polymers.

Prior to this invention, it has not been possible to produce synthetic crystalline polymers of isoprene, pentadiene-(1,3) or of other similar conjugated diolefines. In order for the polymers to exhibit crystallinity they must have a highly regular structure of the polymer chains. Such regularity has not been attainable heretofore by the known methods of polymerizing the conjugated diolefines utilizing initiators of the free radical or ionic type. Such prior art methods generally yield polymers of irregular structure.

This application is a continuation of S.N. 535,252 filed Mar. 17, 1966, now abandoned which in turn was a continuation of 569,690 filed Mar. 6, 1956, now abandoned.

In general, polymerization of the conjugated diolefines can proceed according to various mechanisms which can take place simultaneously to different degrees.

For example, the polymerization of (1,3)-diolefines may proceed with opening of the double bond in the 1,2 or 3,4 positions, or with shift of a double bond into the 2,3 positions and enchainment at position 1,4.

In the latter case, two different configurations of the double bond containing groups are possible namely the cis and trans configurations.

In the case of iosprene polymers, for example, four different types of arrangement of the monomeric units contained in the main chains are possible. Further long branchings can be formed on the chains due to chain transfer-phenomena during the polymerization, or cross-linkages may be formed between different chains leading to or promoting the formation of gels.

When several types of enchainment and configuration are present at the same time and irregularly distributed in the polymer chain, or when different and frequent long branchings are formed on the chains, or when frequent cross-links occur between polymer chains, the polymers are not crystalline.

In the polymers obtained by the prior art methods only a portion, at most 70 to 75% of the double bonds contained in the main polymeric chains have the trans configuration. Actually, the only conjugated diolefine polymers exhibiting crystallinity which have been described heretofore are polymers of butadiene which, in stretched condition, are only partially crystalline at low temperatures. Those butadiene polymers were obtained by subjecting the butadiene to low temperature polymerization conditions under which the proportions of 1,4 linkages of the trans type increase in preference to other possible structural configurations.

By the practice of the present invention, it is possible to obtain polymeric conjugated diolefines which have a substantially regular structure, in which at least 90% of the double bond-containing groups have 1,4 enchainment.

When using certain catalysts (e.g. those prepared from $VOCl_3$ and alkyl aluminum compounds) the obtained products contain crystalline and amorphous portions, which may be separated by solvent extraction.

The crystalline part consists of polymers whose double bonds are of the 1,4-trans type; the amorphous part consists of polymers in which double bonds of the 1,4-cis type are also present.

When using on the other hand catalysts obtained from titanium trichloride or vanadium trichloride and triethyl aluminum, the double bonds contained in the polymer are exclusively or almost exclusively of the trans type, and the polymer is therefore highly crystalline.

These more regular, highly crystalline polymers of the conjugated diolefines have various important uses.

They may e.g. be used in substitution of gutta percha and balata (being of higher mol. wt. and in certain cases of higher melting point) and for the production of hard rubber, or of products which have good elastomeric properties at higher temperatures.

In accordance with the invention, the polymers of high crystallinity are obtained by effecting the polymerization of the conjugated diolefine in an inert liquid medium and with the aid of particular solid polymerization agents which are insoluble in the inert liquid medium in which the polymerization is effected.

The inert liquid medium may be and preferably is a paraffinic hydrocarbon such as, for instance, a light gasoline substantially free of olefine bonds, n-heptane, isooctane and the like. Anhydrous benzene may also be used. The hydrocarbons mentioned are liquid under the polymerization conditions, have boiling points below 150° C., and do not dissolve the polymerization agent or the crystalline polymers produced.

In general, the solid polymerization agent containing a transition metal of groups IV to VI of the Periodic Table and, at least at the surface, linkages between alkyl groups and metal atoms, or active centers such as linkages between metal atoms and hydrogen atoms, which latter are replaceable by alkyl groups to form linkages between metal atoms and alkyl groups by reaction with the diolefine to be polymerized.

The solid polymerization agents which yield more crystalline products, may be obtained by reacting halides or oxyhalides of the transition metal with metallo-organic compounds.

By "transition metals" is meant those metals so described and discussed at pages 103–106 and in chapter 20 of "Inorganic Chemistry" by T. Moellor, published by Wiley & Sons, New York, 1952.

The compound of the transition metal may be a preferably solid halide in which the metal has a valency lower than the valency corresponding to its position in the Periodic Table. Typical compounds of this type include titanium trichloride, titanium dichloride, vanadium trichloride or their mixtures.

Or the transition metal compound may be an oxyhalide which, when reacted with the metallo-organic compound, such as alkyl aluminum or alkyl zinc, yields a solid reaction product which is insoluble in the liquid hydrocarbon medium in which the polymerization of the diolefine is carried out. Compounds of this last-mentioned type include oxychlorides of the transition metals of groups IV to VI of the Periodic Table. Such compounds as VOCl$_3$ and CrO$_2$Cl$_2$ are soluble, per se, in the paraffinic hydrocarbons such as n-heptane, iso-octane and the like, as well as in benzene, in which solvents the polymerization agent is usually prepared and in which the polymerization of the diolefine is usually effected. However, on reaction of those oxychlorides with metallo-organic compounds such as triethyl aluminum, a solid precipitate is obtained which is insoluble in the hydrocarbons and which may be used as polymerization aid in the present method of polymerizing the diolefines.

The compound of the transition metal of groups IV to VI of the Periodic Table thus may be a solid halide or an oxyhalide of titanium, zirconium, hafnium, thorium, vanadium, tantalum, niobium, chromium, molybdenum, tungsten or uranium. In the simple halides the metal has a valency lower than its maximum valency. The oxyhalides may be used provided that, when reacted with the metallo-organic compound, they yield solid products which are insoluble in the liquid medium in which the polymerization is effected.

The metallo-organic compound comprises a substance or a mixture of substances selected from the group consisting of simple and complex compounds the molecules of which contain an element from the group forming the 2nd and 3rd columns of the Periodic Table i.e., beryllium, magnesium, zinc, and other elements of the 2nd column, as well as aluminum, gallium and other elements of the 3rd column.

The valencies of the aforesaid elements of the 2nd and 3rd columns are linked to the same or different alkyl radicals containing 2 to 16 carbon atoms, or to alkoxy radicals containing e.g. 2 to 4 carbon atoms, such as ethyl, propyl, butyl, ethoxy, butoxy, etc. One valence of the element may be satisfied by halogen.

Typical metallo-organic compounds include triethyl aluminum, chlorodiethyl aluminum, dialkyl zinc and so on.

The molar ratio of the heavy metal halide or oxyhalide to the metallo-organic compound may be from 1:1 to 1:10, usually preferably from 1:3 to 1:10.

In preparing the solid polymerization agent, the solid heavy metal halide such as titanium trichloride, may be suspended in the hydrocarbon to be used as the polymerization medium, the metallo-organic compound, such as triethyl aluminum may be suspended or dissolved in the same hyrocarbon, and the compositions then brought together while maintaining a low temperature, preferably a temperature somewhat below room temperature such as 0° C. to 20° C. As polymerization medium the monomer itself may be used.

The composition thus obtained may be further diluted with the hydrocarbon solvent and introduced into an autoclave for instance and preferably of the oscillating stainless steel type.

When a liquid oxyhalide of the heavy metal is used, the solid product resulting from the reaction thereof with the metallo-organic compound may be filtered from the reaction medium and introduced into the polymerization zone with or without prior suspension thereof in the inert liquid hydrocarbon, preferably in the presence of a small amount of the metallo-organic compound.

The polymerization agent can also be prepared in the presence of the diolefine to be polymerized, as shown in examples given hereinbelow.

The autoclave in which the polymerization is carried out should be previously thoroughly dried and evacuated because it is of general advantage to carry out the entire process in the absence of oxygen and water.

In the autoclave, the polymerization agent is caused to react upon and aid polymerization of the conjugated diolefine.

The conjugated diolefine is preferably dried carefully and then pumped into the autoclave.

Surprisingly, when the present polymerization agents are used, the highly crystalline polymers of the conjugated diolefines having the substantially regular structure are obtained even if the polymerization is effected at room temperature. Temperatures between 0° C. and 40° C. may be used, or the temperature may be higher, for example up to 120° C. to 130° C.

The pressure employed is preferably held between normal atmospheric pressure and about 10 atmospheres.

The time required to produce the polymer varies and can be from a fraction of an hour up to several days, the reaction mass being stirred during the polymerization.

The gaseous phase above the polymerization product is then vented and the product may be worked up for separation of non-crystallizable polymers from the crystalline polymers. The mass resulting from the polymerization contains as impurities, inorganic compounds originating from the decomposition of the polymerization aid as well as a residue of such aid. The product may be treated with a suitable reagent, for instance methanol, for decomposing and dissolving the residual polymerization aid, and subsequently freed of non-crystallizable polymers, which occur in varying amounts, by treatment with a solvent for the non-crystallizable polymers. The residual polymerization agent may be decomposed also with water or other hydrolysing agents.

The polymerizates obtained by the present process contain a high proportion of polymers at least 80% of the double bonds of which are contained in the main chain.

The crystalline polymers are obtained in mixture with some amorphous polymers which may be removed by solvent extraction.

By the present method, it is possible to obtain polymers of butadiene which are of more regular structure and more highly crystalline than the polybutadiene known heretofore. It is also possible to produce crystalline polymers of such other conjugated diolefines as isoprene and pentadiene-(1,3), crystalline polymers of which diolefines had not been synthesized prior to the present invention.

By polymerizing isoprene in accordance with the present method, polymers having a crystalline structure similar to that of gutta percha have been obtained. Crystalline isoprene polymers of a molecular weight higher than natural gutta percha may be obtained using a highly purified monomer. By the present method, also, there has been obtained a solid crystalline polymer of pentadiene-(1,3) having a period of identity along the main chain of 4.82 A. corresponding to a chain section containing three single bonds and one double bond, having a trans-configuration belonging to a planar zigzag chain.

This new poly pentadiene-(1,3) is a particularly interesting and valuable new product, on account of the peculiar chemical properties originated from its structure.

In fact, as distinguished from the known polymeric diolefines, it contains short (CH$_3$) side chains bound to non double-bond-bearing carbon atoms.

The new polymer can be extruded readily into filaments having a high tensile strength.

While crystalline polymers are obtained with all of the present polymerization agents, some of these agents are specific for the production of crystalline polymers of certain of the conjugated diolefines having only a negligible quantity, if any, of amorphous polymer mixed with them. Thus, when certain of the solid polymerization agents as defined herein are used as aid in the polymerization of the diolefine, for instance and particularly the agent obtained by the reaction of vanadium trichloride and triethyl aluminum, it is possible to obtain from the conjugated diolefines of simpler structure such as butadiene, products consisting only of crystalline polymers in which a very high percentage (over 80%) of the units derived from the monomer show 1,4 trans enchainment. It is thus possible, in those instances to obtain directly, and without resorting to expensive separation treatment, products which are substantially free of amorphous portions consisting of polymers having irregular distribution of 1,2; 1,4-trans and/or 1,4-cis enchainments. Such amorphous polymers are always present in more or less substantial quantities in the polymers produced with the aid of conventional type catalysts.

The practically entirely crystalline polybutadiene obtained with the aid of the solid polymerization agent prepared from vanadium trichloride and triethyl aluminum, has a molecular weight of the order of hundreds of thousands and generally higher than those of the polymers obtained under the same conditions but using, as polymerization aid, the agent prepared from titanium trichloride.

The following examples are given to illustrate some presently preferred embodiments of the invention, it being understood that these examples are not limitative.

EXAMPLE 1

Three steel balls and a vial containing 6.1 g. of $TiCl_3$ are introduced into a stainless steel autoclave of 2150 cc. capacity. The autoclave is then closed and filled with nitrogen and a solution of 11.4 gms. triethyl aluminum in 500 cc. of anhydrous n-heptane is added. The autoclave is heated, while keeping it motionless, up to 65° C. At this temperature, 310 gms. of butadiene are added and soon after that agitation of the autoclave is started, causing breaking of the vial and release of the titanium trichloride.

The autoclave is agitated continuously for about 20 hours at between 60° C. and 65° C. After that time, the unreacted gases are vented and methanol is pumped in to decompose the organo-metallic compounds present.

The reaction product is a violet-brown semi-solid mass. It is purified by treatment with hot ether and hydrochloric acid under nitrogen, and by subsequent coagulation with methanol.

By filtering and washing with methanol, a solid polymer is isolated. The fractions of the polymer which are insoluble in ether but extractable with hot n-heptane and subsequently with benzene appear highly crystalline under the X-rays. The infrared absorption spectrum shows that the double bonds contained in the product obtained by extraction of the isolated polymer with benzene are not of the vinyl type and that most of such bonds (over 90%) are of the trans type.

EXAMPLE 2

Two steel balls and a glass vial containing 1.8 gm. of $TiCl_3$ are introduced into an autoclave adapted to be shaken and of 0.45 liter capacity. The autoclave is filled with nitrogen and 5 cc. of triethyl aluminum dissolved in 100 cc. of benzene and 60 gms. of technical isoprene (80%) are added. Heating is started and as soon as the temperature has reached about 40° C. shaking of the autoclave is begun, causing the vial containing the $TiCl_3$ to break. The shaking is continued for 20 hours, the temperature being maintained between 40° C. and 80° C. At the end of the 20 hour reaction time, 10 to 20 cc. of methanol are added for decomposing the catalyst, the gases are vented and the unreacted isoprene is recovered. After cooling of the mass, a dense slurry is withdrawn which, after coagulation with methanol acidified with HCl, is filtered and again washed on the filter with methanol.

The crude polyisoprene thus obtained is partially soluble in ether. The portion thereof which is insoluble in ether but soluble in hot benzene appears crystalline under the X-rays and shows the characteristic infra-red spectrum of purified natural gutta percha in the alpha- and beta-forms. At temperatures above 50° C. it shows the same crystalline structure as beta-gutta percha.

EXAMPLE 3

A suspension of 1.4 gm. $TiCl_3$ in 50 cc. of benzene is introduced into an autoclave of 0.45 liter capacity and arranged to be shaken. A solution of 5 cc. of triethyl aluminum in 50 cc. of benzene is then added. The temperature is raised to about 40° C., and 49 gms. of pentadiene-(1,3) are introduced into the autoclave from a cylinder. Agitation of the autoclave is continued for 20 hours, the temperature being maintained at 40–80° C. Methanol (10–30 cc.) is then introduced into the autoclave, the gases are vented, and the unreacted pentadiene is recovered.

The reaction mass withdrawn from the autoclave is treated as described in the foregoing examples for recovery of the crystalline polymer. The portion of the polymer which is soluble in hot benzene but insoluble in ether shows crystallinity under the X-rays. By hot extrusion through a suitable filament-forming device, the polymer is obtained in the form of flexible filaments having good tensile strength and showing, after drawing thereof and mild annealing, X-ray fiber patterns. From said patterns, it appears that the macromolecules of the polymer are arranged parallel to the axis of the filament with a period of identity along the axis of the chain of 4.82 A.

EXAMPLE 4

0.0285 mole of triethyl aluminum and 50 cc. of heptane are introduced into a 250 cc. three neck flask, provided with a stirrer having a vacuum tight seal, filled with pure nitrogen. 0.01 mole of $VOCl_3$, dissolved in 35 cc. of heptane, are added from a dropping funnel to the triethyl aluminum solution, while keeping the latter in agitation. A heavy, black precipitate is immediately formed. As soon as the addition of $VOCl_3$ is finished, gaseous butadiene is introduced into the flask from one of the side necks at such a rate that no gas, or only a very small amount of it, comes out of the flask. The temperature is kept at 20–25° C. After about 2½ hours, introduction of butadiene is stopped and the reaction is brought to an end by adding about 50 cc. methanol.

The content of the flask is treated repeatedly with dilute hydrochloric acid, then it is coagulated with methanol, filtered, and washed on the filter again with methanol. After vacuum drying, 16 g. of polymer are obtained. This polymer appears clearly crystalline under the X-rays.

By successive extractions with acetone, ether and heptane, the polymer is fractionated as follows:

Acetone extract (20% of the total polymer).

Amorphous under the X-rays. An infra-red examination shows that about 29% of the monomeric units are of the type 1,2, 71% of the type 1,4, part of which are 1,4 cis.

Ether extract (10% of the total polymer).

Intrinsic viscosity in toluene at 25° C.: 0.4.

Amorphous under the X-rays. An infra-red examination shows that about 25% of the monomeric units are of the type 1,2, 75% of the type 1,4, part of which are 1,4 cis.

Heptane extract (21% of the total polymer).

Intrinsic viscosity in toluene at 25° C.: 1.59.

Crystalline under the X-rays. An infra-red examination shows that at least 95% of the monomeric units are of the type 1,4-trans.

Residue of the extraction with heptane (47% of the total polymer).

Crystalline under the X-rays, as the heptane extract.

EXAMPLE 5

Into an oscillating evacuated autoclave of 0.5 liter capacity the following materials are introduced:

Triethyl aluminum, 0.0285 mole in 70 cc. anhydrous n-heptane.

$VOCl_3$, 0.056 mole dissolved in 30 cc. n-heptane.

After stirring for 10–20 seconds, 130 g. technical butadiene (95%) are added. The autoclave is kept in agitation for 68 hours at a temperature of 15–20° C., then the reaction is stopped by introducing methanol. The unreacted butadiene is recovered.

The product is withdrawn from the autoclave, treated several times with methanol acidified with hydrochloric acid, and finally washed several times with pure methanol. After vacuum drying, 42 g. of a white solid polymer are obtained. It appears crystalline under the X-rays.

By extraction with acetone, ether, n-heptane and benzene, it is fractionated as follows:

Acetone extract (3.5% of the total polymer).
Amorphous under the X-rays.
Ether extract (10% of the total polymer).
Amorphous under the X-rays. The infra-red spectrum shows that about 66% of the double bonds derive from a 1,4-trans enchainment of the monomeric units.
Heptane extract (16.5% of the total polymer).
Intrinsic viscosity in toluene at 25° C.: 1.49.
Highly crystalline under the X-rays.
Benzene extract (7.5% of the total polymer).
Intrinsic viscosity in toluene at 25° C.: 1.53.
Highly crystalline under the X-rays. An infra-red examination shows that at least 95% of the monomeric units are of the type 1,4-trans.
Residue (62.5% of the total polymer).
At an X-ray examination it appears crystalline, as the benzene and heptane extracts.

EXAMPLE 6

Into an oscillating autoclave of 0.5 liter capacity, from which the air has been removed, the following materials are introduced successively:

Vanadium trichloride, 0.0054 mole.
Triethyl aluminum, 0.0285 mole dissolved in 120 cc. of anhydrous n-heptane.
Technical butadiene (95%), 100 g.

The autoclave is set in agitation and the temperature is kept at 20–25° C. After 64 hours the reaction is stopped by introducing methanol. The unreacted butadiene (about 50% of the amount introduced) is recovered. The reaction product is treated repeatedly with methanol acidified with HCl, then washed several times with pure methanol.

After vacuum drying, 48 g. of a white solid polymer in the form of a very fine powder are obtained. It appears highly crystalline under the X-rays. By successive extractions with ether and benzene, the polymer is divided into the following fractions:

Ether extract (less than 1% of the total polymer).
Amorphous under the X-rays.
Benzene extract (14% of the total polymer).
Highly crystalline under the X-rays. An infrared examination shows that more than 95% of the structural monomeric units are of the type 1,4-trans.
Intrinsic viscosity in toluene at 25° C.: 2.98.
Residue of the extraction with benzene (about 85% of the total polymer). Under the X-rays it appears highly crystalline, as the benzene extract.

EXAMPLE 7

The following materials are introduced into an oscillating autoclave of 0.5 liter capacity, filled with pure nitrogen:

Vanadium trichloride, 0.00575 mole.
Diethyl zinc, 0.0285 mole dissolved in 100 cc. anhydrous n-heptane.
Technical butadiene (95%), 100 g.

The autoclave is kept in agitation for 17 hours at a temperature of 18–22° C., then the reaction is stopped by introducing methanol. The product withdrawn from the autoclave is treated as described previously.

A polymer is thus obtained, which, after treatment with ether to remove the amorphous portion (38.4% of the total polymer), appears highly crystalline under the X-rays, shows a 1,4-trans structure and has an intrinsic viscosity in toluent at 25° C. of 1.5.

EXAMPLE 8

Into an oscillating autoclave of 0.5 liter capacity, previously evacuated, the following materials are introduced:

Triethyl aluminum, 0.028 mole in 80 cc. anhydrous benzene.
Chromyl chloride, 0.006 mole in 50 cc. anhydrous benzene.

After the mixture has been agitated for 10–20 seconds, 75 g. of technical butadiene (95%) are added.

The temperature is kept at 20–25° C. After 17 hours, 50 cc. methanol are introduced into the autoclave and the unreacted butadiene is recovered.

The reaction product, which is treated with hydrochloric acid and methanol as described in the foregoing examples, consists of 27 g. of polymer. By separating the amorphous portion from the total product obtained by extraction with ether, a highly crystalline polymer of 1,4-trans structure is obtained as residue.

EXAMPLE 9

The following materials are introduced into an oscillating autoclave of 0.45 liter capacity, filled with pure nitrogen:

Vanadium trichloride, 0.009 mole.
Triethyl aluminum, 0.0285 mole, dissolved in 120 cc. anhydrous n-heptane.
Isoprene, technical: 55 g.

The autoclave is left in agitation for 7 hours at a temperature of 40–42° C., then the reaction is stopped by introducing methanol. The unreacted isoprene is recovered. The reaction product is treated repeatedly with methanol acidified with HCl, then washed repeatedly with pure methanol, and vacuum dried.

By successive extractions with acetone, ether and heptane, the polymer is divided into the following fractions:

Acetone extract (59.5% of the total polymer).
Amorphous at an X-ray examination.
Ether extract (35% of the total polymer).
At an X-ray examination it appears highly crystalline, with a 1,4-trans structure, similar to that of natural guttapercha.
Heptane extract (5.5% of the total polymer).
Highly crystalline; 1,4-trans structure.

EXAMPLE 10

Into an oscillating autoclave of 0.5 liter capacity the following materials are introduced in an atmosphere of nitrogen:

Vanadium trichloride, 0.0064 mole.
Triethyl aluminum, 0.0179 mole dissolved in 120 cc. anhydrous benzene.
Pentadiene-1,3, 40 g.

The autoclave is kept in agitation for 30 hours at a temperature of 70° C., then the reaction is stopped by introducing methanol. The unreacted monomer is recovered. The reaction product is treated repeatedly with methanol acidified with hydrochloric acid, then washed with pure methanol and finally vacuum dried.

By successive extractions the polymer is divided into the following fractions:

Acetone extract (17.5% of the total polymer).
Amorphous under the X-rays.
Ether extract (58.2% of the total polymer).
Amorphous under the X-rays.
Heptane extract (10% of the total polymer).
Crystalline under the X-rays, 1,4-trans structure; intrinsic viscosity in toluene at 25° C.: 1.71.
Residue (14% of the total polymer); crystalline.

EXAMPLE 11

In an oscillating autoclave of 250 cc. capacity, from which the air has been removed by washing with pure nitrogen, the following materials are introduced:

Vanadium trichloride, 0.0065 mole.

Triethyl aluminum, 0.021 mole, dissolved in 75 cc. n-heptane.

Isoprene, pure (at least 99%) 28 g.

The autoclave is kept in motion, at room temperature, for 65 hrs. Thereafter the reaction is stopped by introducing methanol and the unreacted isoprene is recovered by distillation. The reaction product is treated repeatedly with methanol acidified with HCl, then washed thoroughly with pure methanol and dried under vacuum. 17 g. of a white, solid polymer are obtained, which is fractionated by extracting it in succession with ether and benzene, with the following results:

Ether extract (3.7% of the polymer obtained).

Crystalline under the X-rays, has the 1,4 trans structure of natural gutta-percha in its alpha and beta forms. Intrinsic viscosity in toluene at 30° C.: 3.35.

Benzene extract (93.5% of the total).

Crystalline under the X-rays as the previous fraction.

Residue after extraction with benzene (2.8% of the total).

Highly crystalline, as the previous fractions.

The birefringence, which is observed when examining the less soluble fractions at the microscope under polarized light, persists at temperatures 10–30° C. higher than the melting point of natural gutta-percha. The crystallinity at the X-rays disappears however completely around 70° C., as for natural gutta-percha.

The behavior of the less soluble fractions of the synthetic polymer under polarized light is attributable to the fact that they have a molecular weight higher than the natural polymer.

EXAMPLE 12

0.036 mol triethyl aluminum in 70 cc. anhydrous heptane, 0.0074 mol vanadium oxychloride in 30 cc. anhydrous heptane and 100 g. technical butadiene (95%) are introduced in succession into 500 ml. autoclave filled with nitrogen.

After stirring for 6 hours at 13–14° C., the reaction is stopped by adding methanol. After purification and drying, 30 g. of solid product are obtained, which are fractionated by extraction with acetone, ether, heptane and benzene.

The acetone extract (48% of the total) is amorphous; the infrared spectrum shows that the monomeric units have prevailingly 1,4 enchainment (trans and cis).

The heptane extract (7.2% of the total) is crystalline, and shows a higher percentage of 1,4 trans units. The benzene extract (10.3%) and the residue (26.4%) are crystalline as the heptane extract.

EXAMPLE 13

To 1.6 g. vanadium tetrachloride dissolved in 50 cc. anhydrous n-heptane, contained in a 1000 ml. autoclave fitted with a stirrer and cooling jacket with water circulation, are added, under stirring, in the absence of air and of humidity, 65 cc. triethyl aluminum in 100 ml. n-heptane, and 149 g. dry, freshly distilled butadiene. Polymerization is carried out for 22 hours at 20°. After adding methanol to inactivate the catalyst and venting the residual monomeric butadiene, the polymer is taken out and washed first with HCl containing methanol and then repeatedly with pure methanol.

The solid polymer, after drying at 40° C. under vacuum, amounts to 133 g. (89.2% of the monomer employed). It is a white crystalline powder which, under the microscope in polarized light, shows birefringence up to 150° C. The extraction with ether yields 3.2% of a solid product containing 30% 1,2 polymer, the rest being 1,4 trans. Methylene chloride extracts 4% of the residual solid polymer; this extract contains 95% 1,4 trans polymer.

The residue, which is highly crystalline under the X-rays, consists of high molecular weight 1,4 trans polymer.

When using in the preparation of the catalyst a solid halogenide of a transition metal, higher reaction rates are obtained by using the solid halogenide in the state of very fine division.

This can be obtained by grinding the compound in an anhydrous liquid inert medium, before or after adding the metallo-organic compound.

It may be advantageous to grind the halogenide in the presence of liquid monomer and thereafter add the metallo-organic compound dissolved in the monomer.

The polymerization may be carried out in the absence of solvents.

EXAMPLE 14

1.40 g. vanadium trichloride and 5 g. triethyl aluminum dissolved in 70 cc. anhydrous heptane are introduced in a pressure resistant ball mill of 700 ml. capacity. The cylinder is shaken for 10 hours in a vibrating device in order to obtain a very fine suspension of the catalyst in the solvent.

The obtained suspension is transferred under nitrogen into a 1000 ml. autoclave, fitted with a horseshoe stirrer and previously deaerated.

150 g. butadiene are then added and the mass is stirred for 7 hours at 20° C. Methanol is added, to decompose the catalyst and, proceeding as described in the previous examples, 40 g. poly-butadiene are obtained, which appears highly crystalline under the X-rays.

The product may be fractionated as follows:

1.7% low molecular weight polymers,
1.5% ether extract,
17.8% methylene chloride extract; this fraction when examined at the infrared spectrograph shows a content of approximately 98% of 1,4 trans polymer.

The extraction residue appears highly crystalline when examined under the X-rays.

EXAMPLE 15

1.3 g. $VCl_3$ and 70 cc. butadiene are introduced in a pressure resistant ball mill of 700 ml. capacity. The cylinder is shaken in a vibrating device so as to obtain a very fine suspension of the $VCl_3$. Thereupon 5 g. triethyl aluminum dissolved in butadiene are added, the total amount of butadiene being thus 150 g. The cylinder is shaken for 7½ hours at room temperature. Methanol is then added and the reaction product is taken out; after purification and drying as usual, 55 g. of product are obtained consisting of 1.1% oils, 2% solid low molecular weight polymer soluble in ether, 17.2% solid polymer soluble in methylene chloride, of which approximately 99% is 1,4-trans poly-butadiene, and a residue, which is a solid, powdery, poly-butadiene of very high crystallinity.

EXAMPLE 16

A very fine suspension obtained by milling 17.6 g. vanadium trichloride in 200 cc. butadiene, as indicated in Example 13 are introduced in a 10 l. autoclave, fitted with an efficient horseshoe stirrer and previously deaerated. Butadiene is added, up to a total of 2 kg., and then 56 g. triethyl aluminum dissolved in 1000 cc. heptane.

After stirring for 30 hours, first at 30° C. until the reaction starts, and then at 20° C., the unreacted butadiene is vented, and methanol is added under stirring. The crumbly reaction mass is washed with more methanol and dried at 40° C. under vacuum, in the presence of an antioxidant. 1640 g. of a white polymer are obtained, with an ash content lower than 0.2%.

This product is highly crystalline; less than 5% of it is soluble in the usual solvents.

The process as described and exemplified is applicable to conjugated diolefines at least one of the double bonds of which is a vinyl double bond and having the formula $$CH_2=CH-CR=CHR$$

in which R is the same or different and is hydrogen or any alkyl group.

The solid high molecular weight polymers of the invention containing double bonds in the main chain at least 80% of which have the trans-configuration have high melting points and high moduli of elasticity as indicated in the following table:

| | M.P., °C. | Ultimate tensile strength, kg./cm.$^2$ | Modulus | Modulus at 100% |
|---|---|---|---|---|
| Poly-butadiene | 130 | 500 | >4.000 | 450 |
| Poly-isoprene ca. | 70 | 550 | >3.500 | 169 |

The polymers obtained by the practice of the invention have molecular weights of at least 1,000 usually average molecular weights of at least 20,000. The crystalline polymers have molecular weights of, say, 50,000 to 100,000. In some instances, as explained herein, the crystalline polymers are obtained directly, without admixture with amorphous or non-crystallizable polymers, and may have molecular weights of several hundred thousand.

The crystalline 1,4-trans diolefine polymers of the present invention may be moulded or extruded at a temperature near or higher than the temperature of complete melting. The obtained products have high mechanical strength and flexibility, and show a low permeability to gases and to water vapor. They may be used in the preparation of articles which have to undergo repeated high mechanical stresses.

In the form of thin sheets they may be used in the manufacture of packaging or coating materials which are impervious to gases, and to water and alcohol vapours.

The product having a very high content of 1,4-trans butadiene polymer melts completely above 130° C.; it can be molded at temperatures of the order of 140° C., to hard, flexible laminae which appear crystalline under the X-rays. These laminae have an ultimate tensile strength, referred to the initial cross section area, of about 5–600 kg./cm.$^2$ and elongations of 100–200%.

The practically pure 1,4-trans butadiene polymers melt completely around 140° C.

The 1,4-trans butadiene polymer is dimorph, the low temperature stable form changing rapidly into the high temperature stable form below 70° C.

As previously indicated, the 1,4-trans isoprene polymer is similar to purified gutta-percha and balata. The synthetic product has however the advantage of being free of organic substances of various nature (such as proteins or other nitrogen and oxygen containing organic compounds) which are present in the natural products.

Furthermore a product of molecular weight higher than the natural product may be obtained; it is in fact possible to influence the molecular weight by varying the conditions of polymerization.

The 1,4-trans isoprene polymer is also dimorph, the high temperature stable form melting at about 65° C.

We have found furthermore that the diolefine polymers of the present invention, including the butadiene polymers having a percentage of 1,4-trans monomeric units higher than 97%, may be sulfur vulcanized in the same way as natural rubber.

By treating first the polymers with substances having solvent or plastifying power (as e.g. high boiling, liquid aromatic hydrocarbons) it is thus possible to obtain after vulcanization products which have characteristics typical of elastomers i.e. elastic elongations higher than 100%, coupled with a high reversibility of the elastic deformation. As indicated in Example 19 products of exceptionally high impact resilience may be obtained (75–80% at room temperature, and 90–95% at 90°, as determined with a Goodyear-Healey pendulum with an impact velocity of 5 cm./second).

Such vulcanized products may show, even in the absence of reinforcing agents, a very high hardness, which may be higher than 60 International Rubber Hardness Degrees, as determined with a Shore durometer, scale A.

The above mentioned high values of the resilience are exceptionally high for synthetic hydrocarbon rubbers, in particular for butadiene rubbers.

The commercial types of synthetic butadiene—or butadiene-styrene, rubbers show in fact an impact resilience lower than 70%, and hardness values, in the unfilled state, lower than 50 International Degrees.

In common rubber hardness may be improved, as known, by adding reinforcing agents; this however results in a lower impact resilience.

In the butadiene-styrene rubbers filled with 50% reinforcing agents hardness is as high as 65 International Degrees, while the impact resilience at room temperature falls in general below 50%.

The elastomeric materials obtained from the polymers of the present invention show in general a higher hardness together with a higher elasticity. A product prepared from a prevailingly 1,4-trans butadiene polymer, when loaded with 50% carbon black, shows in fact (see Example 19) a hardness of 80 International Degrees, together with an impact resilience of 55% at room temperature and of about 80% to 90° C.

Among the commercially known hydrocarbon elastomeric products, including the natural products, none shows a high impact resilience (higher than 80%) together with a hardness higher than 60 International Degrees.

The butadiene polymers containing more than 90% of 1,4-trans units, and a few percentages (3–5%) of 1,2 units, as those contained e.g. in the benzene extract of Ex. 5, are more readily vulcanizable to products which show a very high resilience.

Using polymers of this last type in the preparation of elastomeric products the addition of extraneous plastifying agents may be reduced.

The impact resilience of the products obtained by vulcanization of the polymeric diolefines of the present invention, which is already high at room temperature, improves considerably at higher temperatures, and at a higher rate than for ordinary rubbers.

For the products of Ex. 19 the non-elastically absorbed impact energy is of about 20% at room temperature and only of 5% at 90°.

This makes it possible to use the synthetic rubbers obtained from the polymers of the present invention in the manufacturing of articles which have to undergo repeated stresses, particularly for application where it is difficult to dissipate the heat evolved in a deformation process. This applies also to products loaded with carbon black, as shown in Example 20.

EXAMPLE 17

From a prevailingly 1,4-trans polymeric butadiene obtained according to one of the Examples 6, 14, 15, 16, laminae are prepared by casting at 250° C. Specimens obtained from these laminae were tension tested according to the ASTM test D 412–51T with a rate of separation of the grips of 25 mm. per minute; the following results were obtained: ultimate tensile strength 550 kg./cm.$^2$, ultimate elongation 150–200%, modulus about 4000 kg./cm.$^2$.

EXAMPLE 18

From a prevailingly 1,4-trans polymeric isoprene obtained according to Example 11, laminae were prepared by casting at 170–180° C. Specimens from these laminae were tension tested according to the ASTM test D 412–51T, with a rate of separation of the grips of 25 mm. per minute; the following results were obtained:

Ultimate tensile strength—610 kg./cm.$^2$.
Ultimate elongation—300–350%.
Modulus—about 3500 kg./cm.$^2$.

EXAMPLE 19

80 parts of a polymeric butadiene obtained according to Example 15 were treated in a roll mixer for 10 minutes at 170° C. with 20 parts of Dutrex oils.

After cooling the mix to 110° C., curing agents where added as follows:

|  | I | II |
|---|---|---|
| Polymer, parts | 80 | 80 |
| Dutrex oil, parts | 20 | 20 |
| ZnO, parts | 5 | 5 |
| S, parts | 2.5 | 10.0 |
| Tetramethylthiuram disulfide (Eveite 4 MT) | 0.35 | 0.35 |
| Mercaptobenzothiazole disulfide (Eveite DM) | 1.0 | 1.0 |

After curing in a press for 20 minutes at 150° C., the vulcanizates showed the following characteristics:

|  | I | II |
|---|---|---|
| Ultimate tensile strength, kg./cm.² | 190 | 75 |
| Ultimate elongation, kg./cm.² | 270 | 141 |
| Impact resilience at 18° C., percent | 60 | 80 |
| Impact resilience at 90° C., percent | 80 | 90 |
| Hardness Shore A | 84 | 65 |

The tensile strength was measured according to the ASTM test D 412-51T, with a rate of separation of the grips of 25 mm./minute.

A mix of type II when vulcanized after addition of 40 parts carbon black (Kosmos S) yields products of higher hardness (80), which show however a lower impact resilience (55% at room temperature, 80% at 90° C.).

EXAMPLE 20

80 parts of a polymeric butadiene obtained according to Example 15 were treated in a roll mixer for 10 minutes at 170° with 20 parts of Dutrex oils.

After cooling to 110° C., curing agents where added to the mix as follows:

| | |
|---|---|
| Polymer parts | 80 |
| Dutrex oil parts | 20 |
| ZnO parts | 5 |
| S parts | 5 |
| Tetramethylthiuram disulfide (Eveite 4 MT) | 5 |

Curing was carried out in a press at 150° C., for 5 minutes.

The vulcanizate showed the following characteristics:

| | |
|---|---|
| Ultimate tensile strength kg./cm.² | 300 |
| Ultimate elongation (percent) | 220 |
| Impact resilience at 18° (percent) | 60 |
| Impact resilience at 90° (percent) | 82 |
| Hardness Shore A | 95 |

Since various changes and modifications may be made in details in practicing the invention without departing from the spirit and scope thereof, it is not intended to limit the invention to the details given or except as defined in the appended claims.

What is claimed is:

1. A process for the directive polymerization of diolefins selected from the group consisting of butadiene-1,3, isoprene and pentadiene-1,3 to linear, solid, high molecular weight crude homopolymerizates having non-conjugated double bonds in the main chain and comprising mixtures of amorphous non-crystallizable homopolymers having monomeric units with different types of enchainment irregularly distributed in the main chain, and crystalline homopolymers the infra-red spectra for which show that in essentially all of the macromolecules of the homopolymers more than 90% and up to about 99%, of the recurring monomeric units have trans-1,4 enchainment, which recurring trans-1,4 units impart a regular structure to the homopolymers, and that units of other types which may be present are distributed in the main chain of the homopolymers in such a way as not to disturb the ability of the homopolymers to crystallize, said homopolymers having the regular structure also having a melting temperature considerably above room temperature and being strongly crystalline at the X-rays at temperatures between room temperature and their melting temperature, which process comprises polymerizing the diolefin in an inert liquid hydrocarbon medium, at a temperature between 0 degrees C. and 130 degrees C., and in contact with a solid catalyst insoluble in the inert liquid medium and obtained by mixing, in a molar ratio of 1:1 to 1:10, a transition metal compound selected from the group consisting of $TiCl_3$, $VCl_3$, and $VOCl_3$ and an alkyl metal compound selected from the group consisting of aluminum trialkyls, zinc dialkyls and dialkyl aluminum halides, in which the alkyl groups contain 2 to 4 carbon atoms, and isolating the crystalline homopolymers from the crude homopolymerizate by treating the latter with hot ether.

2. The process according to claim 1, characterized in that the diolefin polymerized is butadiene-1,3 and the crystalline homopolymers are isolated from the crude homopolymerizate by treating the latter with hot ether.

3. The process according to claim 1, characterized in that the transition metal compound mixed with the metal alkyl to obtain the catalyst is vanadium trichloride.

4. The process according to claim 1, characterized in that the solid catalyst insoluble in the inert liquid medium is obtained by mixing vanadium oxychloride with the metal alkyl.

5. The process according to claim 1, characterized in that the transition metal compound mixed with the metal alkyl titanium trichloride.

6. The process according to claim 1, characterized in that the diolefin is pentadiene-1,3.

7. The process according to claim 1, characterized in that the diolefin is butadiene-1,3, the catalyst is obtained by mixing vanadium trichloride with triethyl aluminum, and the crude homopolymerizate consists essentially of homopolymers having a temperature of complete melting of from 130° C. to about 140° C. and which exhibit a high degree of crystallinity at the X-rays at temperatures between room temperature and their melting teperature.

8. Synthetic, high molecular weight, linear homopolymerizates of a diolefin selected from the group consisting of butadiene-1,3 and pentadiene-1,3, said homopolymerizates having non-conjugated double bonds in the main chain and consisting of mixtures of distinct and separable amorphous, non-crystallizable homopolymers having monomeric units with different types of enchainment irregularly distributed in the main chain, and crystalline homopolymers the infra-red spectra for which show that in essentially all of the macromolecules of the homopolymers more than 90% and upto about 99%, of the recurring monomeric units have trans-1,4 enchainment, and that units of other types which may be present are distributed in the main chain of the homopolymers in such a way as not to disturb the ability of the homopolymers to crystallize, the crystalline homopolymers having a melting temperature considerably above room temperature and showing a high percent of crystallinity at the X-rays at temperatures between room temperature and their melting temperature.

9. Homopolymerizates of butadiene-1,3, according to claim 8.

10. Homopolymerizates of pentadiene-1,3, according to claim 8.

11. The homopolymerizates of claim 9, sulfur-vulcanized to elastomeric materials.

12. The homopolymerizates of claim 10, sulfur-vulcanized to elastomeric materials.

13. An essentially linear, high molecular weight, solid homopolymer of pentadiene-1,3 consisting essentially of crystalline poly (pentadiene-1,3) having non-conjugated double bonds in the main chain, the infra-red spectra of said homopolymer showing that, in essentially all of the macromolecules thereof, more than 90% and up to about 99%, of the recurring monomeric units have trans-1,4 enchainment and that units of other types which may be present are distributed in the main chain of the macromolecules in such a way as not to disturb the ability of the homopolymer to crystallize, said homopolymer being further characterized in that it has a melting temperature considerably above room temperature, is strongly crystalline when subjected to X-rays examination between room temperature and the melting temperature, has a high modulus of elasticity at normal temperatures, and X-rays patterns of drawn fibers thereof show a period of identity along the axis of the main chain of 4.82 A.

14. An essentially, linear, high molecular weight, solid homopolymer of butadiene-1,3 consisting essentially of crystalline polybutadiene-1,3 having non-conjugated double bonds in the main chain, said homopolymer being further characterized in that it has a melting temperature between 130° C. and 140° C., is crystalline at the X-rays at all temperatures below its melting temperature, is diamorphous, showing a transition at about 70° C. from a form having an identity period of about 4.9 A. to a form having an identity period of about 4.7 A. and which is stable up to the melting temperature, and its infra-red spectrum shows that in essentially all of the macromolecules of the homopolymer more than 90% and up to about 99%, of the recurring monomeric units have trans-1,4 enchainment, which recurring trans-1,4 units impart a regular structure to the polybutadiene, and that units of other types which may be present are distributed in the main chain of the polybutadiene in such a way as not to disturb the ability of the polybutadiene to crystallize.

15. A homopolymer of butadiene-1,3 according to claim 14, and furher characterized by being non-extractable with hot ether.

16. The process according to claim 1, characterized in that the diolefin is isoprene.

References Cited

Binder, I and E Chem., vol. 46, No. 8, 1954, pp. 1727–30 relied on.

D'Ianni et al., I and E Chem., vol. 42, No. 1, 1950, pp. 95–102 relied on.

Stewart et al., I and E Chem., vol. 45, No. 1, January 1953, pp. 173–181 relied on.

JOSEPH L. SCHOFER, Primary Examiner

R. A. GAITHER, Assistant Examiner

U.S. Cl. X.R.

260—795, 942

UNITED STATES PATENT OFFICE
CERTIFICATE OF CORRECTION

Patent No. 3,550,158                    Dated   December 22, 1970

Inventor(s)            Giulio Natta et al.

It is certified that error appears in the above-identified patent and that said Letters Patent are hereby corrected as shown below:

In the heading to the printed specification, after line 6, insert -- Claims priority, applications Italy, 29,229 filed March 12, 1955 and 34,564 filed December 22, 1955 --.

Signed and sealed this 27th day of March 1973.

(SEAL)
Attest:

EDWARD M. FLETCHER, JR.                ROBERT GOTTSCHALK
Attesting Officer                      Commissioner of Patent